(12) United States Patent
Tonkovich et al.

(10) Patent No.: US 6,969,505 B2
(45) Date of Patent: Nov. 29, 2005

(54) PROCESS FOR CONDUCTING AN EQUILIBRIUM LIMITED CHEMICAL REACTION IN A SINGLE STAGE PROCESS CHANNEL

(75) Inventors: Anna Lee Tonkovich, Marysville, OH (US); Wayne W. Simmons, Dublin, OH (US); Kai Tod Paul Jarosch, Bexley, OH (US); Terry Mazanec, Solon, OH (US); Eric Daymo, Marysville, OH (US); Ying Peng, Columbus, OH (US); Jennifer Lynne Marco, South Charleston, OH (US)

(73) Assignee: Velocys, Inc., Plain City, OH (US)

( * ) Notice: Subject to any disclaimer, the term of this patent is extended or adjusted under 35 U.S.C. 154(b) by 370 days.

(21) Appl. No.: 10/219,956

(22) Filed: Aug. 15, 2002

(65) Prior Publication Data

US 2004/0034111 A1    Feb. 19, 2004

(51) Int. Cl.⁷ ............................................. C01B 3/26
(52) U.S. Cl. ............... 423/648.1; 423/651; 423/652; 423/655; 423/656; 423/659; 518/250; 518/728
(58) Field of Search ....................... 423/648.1, 651, 423/652, 655, 656, 659; 518/250, 728

(56) References Cited

U.S. PATENT DOCUMENTS

| | | | |
|---|---|---|---|
| 3,176,763 A | 4/1965 | Frohlich | |
| 4,128,409 A | 12/1978 | Bennett | 62/26 |
| 4,183,403 A | 1/1980 | Nicholson | 165/166 |
| 4,386,505 A | 6/1983 | Little | 62/514 R |
| 4,392,362 A | 7/1983 | Little | 62/514 R |
| 4,434,845 A | 3/1984 | Steeb | |
| 4,516,632 A | 5/1985 | Swift et al. | 165/167 |
| 4,690,702 A | 9/1987 | Paradowski et al. | 62/23 |
| 5,058,665 A | 10/1991 | Harada | 165/164 |
| 5,114,450 A | 5/1992 | Paradowski et al. | 62/24 |
| 5,271,459 A | 12/1993 | Daschmann | 165/166 |
| 5,309,637 A | 5/1994 | Moriarty | 29/890.054 |
| 5,317,805 A | 6/1994 | Hoopman et al. | 29/890.03 |
| 5,324,452 A | 6/1994 | Allam et al. | 252/373 |
| 5,518,697 A | 5/1996 | Dalla Betta et al. | 422/173 |
| 5,611,214 A | 3/1997 | Wegeng et al. | 62/498 |
| 5,674,301 A | 10/1997 | Sakai et al. | 48/61 |
| 5,689,966 A | 11/1997 | Zess et al. | 62/238.6 |
| 5,727,618 A | 3/1998 | Mundinger et al. | 165/80.4 |
| 5,775,114 A | 7/1998 | Ji | 62/121 |
| 5,811,062 A | 9/1998 | Wegeng et al. | 422/129 |
| 5,858,314 A | 1/1999 | Hsu et al. | 422/211 |
| 5,911,273 A | 6/1999 | Brenner et al. | 165/167 |
| 5,927,396 A | 7/1999 | Damsohn et al. | 165/167 |

(Continued)

FOREIGN PATENT DOCUMENTS

| | | |
|---|---|---|
| CA | 2247662 | 3/1999 |
| DE | 36 26 466 A1 | 2/1991 |
| DE | 39 26 466 A1 | 2/1991 |
| DE | 3926466 A1 | 2/1991 |

(Continued)

OTHER PUBLICATIONS

U.S. Appl. No. 10/219,990 filed Aug. 15, 2002.

(Continued)

Primary Examiner—Stanley S. Silverman
Assistant Examiner—Maribel Medina
(74) Attorney, Agent, or Firm—Renner, Otto, Boisselle & Sklar, LLP

(57) ABSTRACT

This invention relates to a process for conducting an equilibrium limited chemical reaction in a single stage process channel. A process for conducting a water shift reaction is disclosed. A multichannel reactor with cross flow heat exchange is disclosed.

23 Claims, 2 Drawing Sheets

U.S. PATENT DOCUMENTS

| | | | |
|---|---|---|---|
| 6,056,932 A | 5/2000 | Von Hippel et al. | 423/376 |
| 6,126,723 A | 10/2000 | Drost et al. | 96/4 |
| 6,129,973 A | 10/2000 | Martin et al. | 428/166 |
| 6,159,358 A | 12/2000 | Mulvaney, III et al. | 208/46 |
| 6,167,952 B1 | 1/2001 | Downing | 165/167 |
| 6,192,596 B1 | 2/2001 | Bennett et al. | 34/76 |
| 6,193,501 B1 | 2/2001 | Masel et al. | 431/170 |
| 6,200,536 B1 | 3/2001 | Tonkovich et al. | 422/177 |
| 6,203,587 B1 | 3/2001 | Lesieur et al. | 48/61 |
| 6,216,343 B1 | 4/2001 | Leland et al. | 29/890.032 |
| 6,220,497 B1 | 4/2001 | Benz et al. | 228/118 |
| 6,228,341 B1 | 5/2001 | Hebert et al. | 423/352 |
| 6,230,408 B1 | 5/2001 | Ehrfeld et al. | 29/890.039 |
| 6,241,875 B1 | 6/2001 | Gough | 208/106 |
| 6,274,101 B1 | 8/2001 | Sechrist | 422/198 |
| 6,284,217 B1 | 9/2001 | Wang et al. | 423/651 |
| 6,294,138 B1 | 9/2001 | Von Hippel et al. | 422/200 |
| 6,313,393 B1 | 11/2001 | Drost | 136/201 |
| 6,318,913 B2 | 11/2001 | Wakamiya et al. | 396/576 |
| 6,352,577 B1 | 3/2002 | Martin et al. | 96/4 |
| 6,364,007 B1 | 4/2002 | Fischer | 165/166 |
| 6,381,846 B2 | 5/2002 | Insley et al. | 29/890.039 |
| 6,389,696 B1 | 5/2002 | Heil et al. | 29/890.039 |
| 6,415,860 B1 | 7/2002 | Kelly et al. | 165/748 |
| 6,488,838 B1 | 12/2002 | Tonkovich et al. | 208/108 |
| 6,497,856 B1 | 12/2002 | Lomax, Jr. et al. | 423/651 |
| 6,540,975 B2 | 4/2003 | Tonkovich et al. | 423/659 |
| 6,675,875 B1 | 1/2004 | Vafai et al. | 165/80.4 |
| 6,746,651 B1 | 6/2004 | Ponzo et al. | 422/220 |
| 6,746,819 B1 | 6/2004 | Schmitz et al. | 430/272.1 |
| 6,747,178 B1 | 6/2004 | Harston et al. | 570/175 |
| 6,749,814 B1 | 6/2004 | Bergh et al. | 422/130 |
| 6,749,817 B1 | 6/2004 | Mulvaney, III | 422/200 |
| 6,755,211 B1 | 6/2004 | O'Connor et al. | 137/554 |
| 6,756,340 B2 | 6/2004 | Voskoboynikov et al | 502/328 |
| 6,756,515 B2 | 6/2004 | Rende et al. | 585/444 |
| 6,764,660 B1 | 7/2004 | Wiede, Jr. et al. | 422/198 |
| 6,769,444 B2 | 8/2004 | Guzman et al. | 137/15.01 |
| 6,770,245 B2 | 8/2004 | Akporiaye et al. | 422/82.12 |
| 6,773,684 B2 | 8/2004 | Lesieur et al. | 422/198 |
| 2001/0024629 A1 | 9/2001 | Brauchle et al. | 422/198 |
| 2001/0025705 A1 | 10/2001 | Nash et al. | 165/167 |
| 2001/0030041 A1 | 10/2001 | Boneberg et al. | 165/166 |
| 2001/0051662 A1 | 12/2001 | Arcuri et al. | 518/704 |
| 2002/0029871 A1 | 3/2002 | Kern | 165/151 |
| 2002/0031455 A1 | 3/2002 | Hippel et al. | 422/173 |
| 2002/0051741 A1 | 5/2002 | Abe et al. | 422/199 |
| 2002/0071797 A1 | 6/2002 | Loffler et al. | 422/190 |
| 2002/0081473 A1 | 6/2002 | Hanai et al. | 429/26 |
| 2002/0106539 A1 | 8/2002 | Chung et al. | 429/19 |
| 2002/0131907 A1 | 9/2002 | Iwasaki | 422/110 |
| 2004/0104010 A1 | 6/2004 | Kenny et al. | 165/80.4 |
| 2004/0107831 A1 | 6/2004 | Graham et al. | 95/96 |
| 2004/0123626 A1 | 7/2004 | Caze et al. | 65/17.2 |
| 2004/0125689 A1 | 7/2004 | Ehrfeld et al. | 366/165.1 |
| 2004/0127352 A1 | 7/2004 | Jin et al. | 502/322 |
| 2004/0130057 A1 | 7/2004 | Mehrabi et al. | 264/171.13 |
| 2004/0131345 A1 | 7/2004 | Kylberg et al. | 392/465 |
| 2004/0131507 A1 | 7/2004 | Saitmacher et al. | 422/111 |
| 2004/0131829 A1 | 7/2004 | Joesph et al. | 428/166 |
| 2004/0132832 A1 | 7/2004 | Espinoza et al. | 518/716 |
| 2004/0136902 A1 | 7/2004 | Plath et al. | 423/651 |
| 2004/0141893 A1 | 7/2004 | Martin | 422/198 |
| 2004/0143059 A1 | 7/2004 | Cabrera | 524/800 |
| 2004/0144421 A1 | 7/2004 | Parce et al. | 137/14 |
| 2004/0156762 A1 | 8/2004 | Schuppich et al. | 422/191 |

FOREIGN PATENT DOCUMENTS

| | | |
|---|---|---|
| EP | 0 885 086 B1 | 2/1997 |
| EP | 0 903 174 A1 | 3/1999 |
| EP | 1 018 485 A1 | 7/2000 |
| EP | 1 311 341 B1 | 8/2001 |
| EP | 0 904 608 B1 | 12/2001 |
| WO | 97/32687 | 9/1997 |
| WO | 98/55812 | 12/1998 |
| WO | 00/06295 | 2/2000 |
| WO | 00/76651 A1 | 12/2000 |
| WO | 01/10773 A1 | 2/2001 |
| WO | 01/12312 A2 | 2/2001 |
| WO | 01/12753 A1 | 2/2001 |
| WO | 01/54807 A1 | 8/2001 |
| WO | 01/69154 A1 | 9/2001 |
| WO | 01/95237 A2 | 12/2001 |
| WO | 02/00547 A1 | 1/2002 |
| WO | 02/02220 A1 | 1/2002 |
| WO | 03/026788 | 4/2003 |
| WO | 03/078052 A1 | 9/2003 |
| WO | 03/106386 A2 | 12/2003 |
| WO | 2004/045760 | 6/2004 |
| WO | 2004/050799 | 6/2004 |
| WO | 2004/052518 | 6/2004 |
| WO | 2004/052530 | 6/2004 |
| WO | 2004/052941 | 6/2004 |
| WO | 2004/054013 | 6/2004 |
| WO | 2004/054696 | 7/2004 |
| WO | 2004/062790 | 7/2004 |
| WO | 2004/062791 | 7/2004 |
| WO | 2004/062792 | 7/2004 |
| WO | 2004/067160 | 8/2004 |
| WO | 2004/067444 | 8/2004 |
| WO | 2004/067492 | 8/2004 |
| WO | 2004/067708 | 8/2004 |

OTHER PUBLICATIONS

U.S. Appl. No. 10/222,196 filed Aug. 15, 2002.

U.S. Appl. No. 10/222,604 filed Aug. 15, 2002.

TeGrotenhuis et al.; "Optimizing Microchannel Reactors by Trading-Off Equilibrium and Reaction Kinetics through Temperature Management"; International Conference on Microreaction Technology; Mar. 10-14, 2002.

Srinivasan et al.; "Micromachined Reactors for Catalytic Partial Oxidation Reactions"; *AIChE Journal*; Nov. 1997; vol. 43, No. 11.

M. Matlosz et al.; Microreaction Technology; Proceedings of the Fifth International Conference on Microreaction Technology; Oct. 2001; Springer-Verlag.

Smith, Eric M.; Thermal Design of Heat Exchangers; A Numerical Approach; 1997; Wiley, New York.

Pettersen et al.; Development of Compact Heat Exchangers for $Co_2$ Air-Conditioning Systems; vol. 21, No. 3; pp. 180-193; 1998; Great Britain.

Wadekar, V. V.; Compact Heat Exchangers; A Che's Guide to Ches; American Institute of Chemical Engineers; Dec. 2000; pp. 39-40; United States.

Rostami, A. A., et al.; Flow and Heat Transfer for Gas Flowing in Microchannels: A Review; Heat and Mass Transfer 38; 2002; pp. 359-367; Springer-Veriag.

Wegeng, R. S. et al.; Compact Fuel Processors for Fuel Cell Powdered Automobiles Based On Microchannel Technology; Fuel Cells Bulleting No. 28; pp. 8-13.

Kays, W. M.; Compact Heat Exchangers, Third Edition; 1984; Reprint Edition 1998 With Corrections; Kreiger Publishing Co.; Malabar, Florida.

Smith, Eric M.; Thermal Design of Heat Exchangers. A Numerical Approach; 1997; Wiley; New York, pp. 279-288.

Waku et al.; "Effects of $O_2$ Concentration on the Rate and Selectivity in Oxidative Dehydrogenation of Ethane Catalyzed by Vanadium Oxide: Implications for $O_2$ Staging and Membrane Reactors"; Ind. Eng. Chem. Res. 2003, 41, 5462-5466.

International Search Report, Application No. PCT/US03/23890, dated Dec. 10, 2003.

Written Opinion, International Application No. PCT/US03/23890, dated Sep. 14, 2004.

Besser, Ronald S. "New Directions in Reactor Design Through Miniaturization". Sep. 13, 2002, Tulane Engineering Forum.

Ouyang et al. "Flexible Microreactor System for Chemical Research at Moderate and High Temperatures". Stevens Institute of Technology.

PROCESS FOR CONDUCTING AN EQUILIBRIUM LIMITED CHEMICAL REACTION IN A SINGLE STAGE PROCESS CHANNEL

CROSS-REFERENCE TO RELATED APPLICATIONS

The present application is related to the following commonly-assigned applications filed concurrently herewith on Aug. 15, 2002: "Integrated Combustion Reactors and Methods of Conducting Simultaneous Endothermic and Exothermic Reaction," Ser. No. 10/222,196, "Multi-Stream Microchannel Device," Ser. No. 10/222,604; and "Process for Cooling a Product in a Heat Exchanger Employing Microchannels for the Flow of Refrigerant and Product," Ser. No. 10/219,990. These applications are incorporated herein by reference.

TECHNICAL FIELD

This invention relates to a process for conducting an equilibrium limited chemical reaction in a single stage process channel. The process is suitable for conducting a water-gas shift reaction as well as other reactions.

BACKGROUND OF THE INVENTION

The water-gas shift reaction is an equilibrium limited exothermic chemical reaction that follows the equation:

$$CO + H_2O \rightarrow H_2 + CO_2$$

The equilibrium constant and thus the driving force for this reaction increases as temperature decreases. Typical production methods for conducting the water-gas shift reaction involve the use of two reactors. In the first reactor a gaseous reactant containing CO and $H_2O$ is typically reacted in the presence of a catalyst at a temperature of about 350° C. to about 400° C. to obtain a conversion of CO of about 80% or higher. The resulting intermediate product is then advanced through a heat exchanger where it is cooled and then to a second reactor which is operated at a temperature of about 200° C. to about 250° C. to complete the reaction. The contact time in these reactors is typically in the range of about 3 to about 9 seconds. The problem with these techniques is that they require the use of reactors that are relatively large and costly.

The present invention provides a solution to this problem by providing a process for conducting the water-gas shift reaction in a single stage process channel wherein the contact time within the process channel may be in the range of about 10 to about 1000 milliseconds. These reactors have reaction zones that are on the order of about ⅓ to about 1/900 the size of conventional processing hardware for the same production output. This invention provides a viable source of $H_2$ for use in fuel cells, oil refining, chemical processing, and the like. The inventive process is also suitable for conducting other chemical reactions including Fischer-Tropsch synthesis, steam reforming, methanol synthesis, ammonia synthesis, and the like.

SUMMARY OF THE INVENTION

This invention relates to a process for conducting an equilibrium limited chemical reaction in a single stage process channel to make a desired product, the process comprising:

(A) flowing reactants through a first reaction zone in the single stage process channel under a first set of reaction conditions to produce an intermediate product, the first set of reaction conditions being suitable for producing a first theoretical equilibrium product, the intermediate product comprising the desired product; and (B) flowing reactants not reacted during step (A) and the intermediate product through a second reaction zone in the single stage process channel under a second set of reaction conditions to produce the final product, the second set reaction conditions being suitable for producing a second theoretical equilibrium product, the second theoretical equilibrium product having a higher concentration of the desired product than the first theoretical equilibrium product, the final product comprising the desired product.

In one embodiment, the concentration of the desired product in the final product is higher than in the intermediate product.

In one embodiment, the process further comprises subsequent to step (A) but prior to step (B), flowing the reactants not reacted during step (A) and the intermediate product formed during step (A) through another reaction zone in the single stage process channel under another set of reaction conditions to produce another intermediate product, the another set of reaction conditions being suitable for producing another theoretical equilibrium product, the another theoretical equilibrium product having a higher concentration of the desired product than the first theoretical equilibrium product, the another intermediate product comprising the desired product.

In one embodiment, the invention provides for a process for conducting a water-gas shift reaction in a single stage process channel, comprising: flowing reactants comprising CO and $H_2O$ through the single stage process channel, the process channel having an entrance where the reactants enter and an exit where a product exits, the process channel containing a water-gas shift reaction catalyst, the reactants contacting the catalyst as they flow through the process channel and undergoing an exothermic reaction resulting in the formation of the product, the product comprising $H_2$ and $CO_2$; and flowing a coolant fluid through a coolant channel in thermal contact with the process channel, the thermal contacting of the coolant fluid with the process channel resulting in the formation of a first reaction zone and a second reaction zone within the process channel, the first reaction zone being near the entrance to the process channel and the second reaction zone being near the exit to the process channel, the temperature within the first reaction zone being higher than the temperature within the second reaction zone, the rate of formation of the product being greater in the first reaction zone than in the second reaction zone, the conversion of CO increasing as reactants flow through the second reaction zone.

In one embodiment, the invention provides for an apparatus, comprising: an array of single stage process microchannels arranged in rows extending parallel to each other, a catalyst being contained within the single stage process microchannels; and an array of heat exchange channels arranged in rows extending parallel to each other, the heat exchange channels extending transversely of the single stage process microchannels, the rows of heat exchange channels and the rows of single stage process microchannels being positioned in separate alternating planes.

BRIEF DESCRIPTION OF THE DRAWINGS

In the annexed drawings like parts and features are designated by like references.

DETAILED DESCRIPTION OF THE INVENTION

Figure 1:
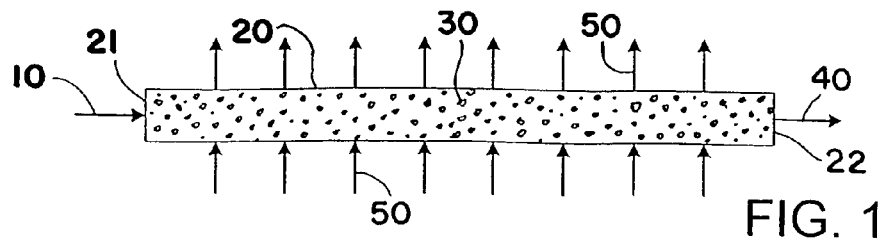
FIG. 1 is a schematic flow sheet illustrating the inventive process in a particular form.

The term "single stage process channel" refers to a process channel in which an equilibrium limited chemical reaction is conducted under two or more sets of equilibrium conditions to form a desired product before the product leaves the channel. These process channels are distinguished from multi-stage reactors that require cooling or heating between the stages.

The term "equilibrium limited chemical reaction" refers to a chemical reaction in which two opposing chemical reactions are occurring at equal rates. The equilibrium may be displaced or shifted by changing the reaction temperature, pressure, flow rate, catalyst, or the composition of the reactants.

The term "microchannel" refers to a channel having at least one internal dimension of width or height of up to about 10 millimeters (mm), and in one embodiment from about 0.25 to about 10 mm, and in one embodiment from about 1 to about 8 mm, and in one embodiment about 2 to about 6 mm, and in one embodiment about 2.5 to about 5.5 mm.

The term "contact time" refers to the volume of the catalyst bed divided by the volumetric gas feed flow rate at standard temperature and pressure.

The term "reaction zone" refers to the total volume of the catalyst and surrounding area through which reactants and products flow.

The term "residence time" refers to the volume of the reaction zone divided by the inlet volumetric flow rate of reactants at the reaction system's temperature and pressure.

The term "conversion of CO" refers to the CO mole change between reactant and product divided by the moles of CO in the reactant.

The term "selectivity to $CO_2$" refers to the moles of $CO_2$ produced divided by the moles of $CO_2$ produced plus moles of $CH_4$ produced.

The term "standard liters per minute" or "SLPM" refers to a flow rate in liters per minute measured at 0° C. and one atmosphere of pressure.

The inventive process is suitable for conducting an exothermic equilibrium limited chemical reaction or an endothermic equilibrium limited chemical reaction in a single stage process channel. When the chemical reaction is exothermic, the reaction is subjected to removing heat via cooling. When the chemical reaction is endothermic, the reaction is subjected to adding heat. The heating or cooling provided by the exothermic or endothermic chemical reaction in combination with the added cooling or heating results in the formation of at least two reaction zones within the process channel. One of the reaction zones may be a first reaction zone near the entrance to the process channel. Another of the reaction zones may be a second reaction zone near the exit to the process channel. One or more additional reaction zones may be formed between the first reaction zone and the second reaction zone. The temperature in the first reaction zone may be higher than the temperature in the second reaction zone. Alternatively, the temperature in the first temperature zone may be lower than the temperature in the second reaction zone. The added cooling or heating may be provided by a heat exchange fluid that flows through a heat exchange channel in a cross current, counter current or co-current direction relative to the direction of flow of the reactants through the process channel. The reactants and products may be fluids, that is, they may be gases, liquids, mixtures of gases and liquids, mixtures of gases and solids, or mixtures of gases, liquids and solids. The process channel and/or heat exchange channel may be a microchannel. Although the above discussion refers to the use of a single process channel and/or heat exchange channel, it is to be understood that with the inventive process a plurality of process channels and/or heat exchange channels may be operated in parallel. For example, tens, hundreds, thousands, tens of thousands, hundreds of thousands, or millions of process channels and/or heat exchange channels operating at the same time in parallel may be employed with the inventive process.

In the first reaction zone the inventive process is conducted under a first set of reaction conditions suitable for producing a first theoretical equilibrium product. The composition of the first theoretical equilibrium product is dependent upon one or more of the conditions of temperature, pressure, flow rate, catalyst, or composition of the reactants being used. The composition of the intermediate product that is formed in the first reaction zone may not and need not have the same composition as the composition of the first theoretical equilibrium product, however, the reaction in the first reaction zone has the potential for forming the first theoretical equilibrium product. The intermediate product formed in the first reaction zone contains the desired product for the reaction as well as other products. For example, if the reaction is a water gas shift reaction, the desired product may be $H_2$, and the intermediate product contains $H_2$ and may contain other products such as $CO_2$, CO and $H_2O$. The theoretical equilibrium value for the conversion of CO for the reaction based upon the reaction conditions employed may be, for example about 95%, and the actual conversion of CO obtained in the first reaction zone with the inventive process may be from about 20 to about 100% of the theoretical equilibrium value, and in one embodiment about 50 to about 95% of the theoretical equilibrium value. For the water gas shift reaction the bulk of the conversion typically takes place in the first reaction zone. For example, for the water gas shift reaction, from about 40 to about 95%, and in one embodiment about 60 to about 95% of the CO may be converted in the first reaction zone.

In the second reaction zone the process is conducted under a second set of reaction conditions suitable for producing a second theoretical equilibrium product. The composition of the second theoretical equilibrium product is also dependent upon one or more of the conditions of temperature, pressure, flow rate, catalyst, or composition of the reactants being used. The composition of the final product that is formed in the second reaction zone may not and need not have the same composition as the composition for the second theoretical equilibrium product, however, the reaction in the second reaction zone has the potential for forming the second theoretical equilibrium product. The final product formed in the second reaction zone contains the desired product for the reaction as well as other products. For example, if the reaction is a water gas shift reaction, the desired product may be $H_2$, and the final product contains $H_2$ and may contain other products such as $CO_2$, CO and $H_2O$. The theoretical equilibrium value for the conversion of CO for the reaction based upon the reaction conditions employed may be, for example about 98%, and the actual conversion of CO obtained in the second reaction zone with the inventive process may be from about 50 to about 100% of the theoretical equilibrium value, and in one embodiment about 80 to about 99% of the theoretical equilibrium value. For the water gas shift reaction, the rate of reaction is lower in the second reaction zone but the conversion of CO increases. For example, for the water gas shift reaction the conversion of CO achieved at the end of the second reaction zone may be from about 1 to about 50%, and in one embodiment about 5 to about 40%.

As indicated above, one or more additional reaction zones may be employed between the first reaction zone and the second reaction zone. In these additional reaction zones the process is conducted under one or more sets of reaction conditions suitable for producing one or more additional theoretical equilibrium products. The composition of each of these additional theoretical equilibrium products may be dependent upon one or more of the conditions of temperature, pressure, flow rate, catalyst, or composition of the reactants being used. The composition of each of the actual intermediate products that is formed in these reaction zones may not and need not have the same composition as the corresponding theoretical equilibrium products, however, the reactions in these reaction zones have the potential for forming such theoretical equilibrium products.

The process channel may have one or more additional entrances along its length to permit entry of one or more additional reactants at downstream points in the reaction. In one embodiment, the process channel has an elongated section extending between the entrance to the process channel and the exit to the process channel and at least one additional entrance to the process channel in the elongated section to permit the entry of at least one additional gaseous reactant into the process channel. This embodiment may be used with certain oxidation and hydrogenation reactions. For these reactions a thermal profile that is often desired is near isothermal to prevent deep oxidation or full hydrogenation, or non-isothermal where the maximum temperature is maintained below temperatures that lead to catalyst sintering or deactivation. A thermal profile that does not challenge the structural limits of the reactor or the materials of construction used in the reactor is also desirable. To achieve this it is advantageous to add oxygen or hydrogen to the process channel at additional entry points along the length of the process channel. The local temperature is lower when only a fraction of the overall oxygen or hydrogen is added at various intermediate points along the length of the process channel. This lower overall temperature inhibits undesired reactions to carbon dioxide in the case of oxidation reactions or fully hydrogenated products in the case of hydrogenation reactions.

The process channel may contain a single catalyst or two more different catalysts. Catalyst activity along the length of the process channel may be changed in a gradual or step-wise fashion to create desired thermal profiles within the process channel. These thermal profiles help tailor the desired selectivity profile for the process channel. In one embodiment, the process channel contains a first catalyst in the first reaction zone near the entrance to the process channel and a second catalyst in the second reaction zone near the exit to the process channel. The catalyst need not reside permanently in the process channel. In one embodiment, the catalyst may be carried through the process channel by the flow of the reactants and products.

The heat exchange fluid may either be a coolant for the case of an exothermic reaction, or a heating medium for the case of an endothermic reaction. The heat exchange fluid may comprise a hydrocarbon in either gaseous, liquid, or multi-phase form. The heat exchange fluid may also be a mixture of combustion products formed in the heat exchange channel during concurrent combustion to drive an endothermic reaction.

The use of a gradual or step-wise change in catalyst activity along the length of the process channel may be used with a Fischer-Tropsch synthesis reaction. As temperature increases, an undesired side methanation reaction becomes increasingly favored. The most active part of the exothermic Fischer-Tropsch reaction is at the entrance to the process channel where the concentration of the gaseous reactants is the highest. The hot spot that is subsequently created then leads to an increase in undesired methane formation. A substitution of a less active catalyst at the entrance to the process channel decreases the local conversion and then in turn reduces the magnitude of the hot spot and the prevalence toward methanation. A gradual increase in catalyst activity down the length of the process channel leads to a higher overall conversion with lower overall methane selectivity. Alternatively, the process channel may be divided into sections (e.g., quadrants, etc.) where the least active catalyst is present at the entrance to the process channel followed by successively increasing activity zones down the length of the process channel in the direction of the flow of the reactants.

Endothermic reactions are more highly favored both thermodynamically and kinetically at higher temperatures. Some endothermic reactions are also coupled with favorable secondary exothermic reactions that are favored thermodynamically at lower temperatures. An example of this is the steam reforming of methane reaction (or other reforming reactions of higher molecular weight hydrocarbons) to produce hydrogen and a mixture of carbon monoxide and carbon dioxide. At higher temperatures, more methane is converted to hydrogen and carbon monoxide. As the temperature decreases, the exothermic nature of the coupled water gas shift reaction of carbon monoxide and water to carbon dioxide and hydrogen favors an increased theoretical equilibrium production of hydrogen and carbon dioxide. In this embodiment the gaseous reactants flow through a high temperature reaction zone in the range of about 450 to about 950° C. where the methane (or higher molecular weight hydrocarbons) conversion approaches or attains equilibrium. The resulting product mixture then continues to flow through the process channel through a lower temperature reaction zone wherein the operating temperature is at least about 20° C. lower than in the higher temperature reaction zone and is in the range of about 400 to about 850° C. In the lower temperature reaction zone the product synthesis gas (carbon monoxide and water) from the high temperature reaction zone continues to convert to carbon dioxide and hydrogen.

The formation of methanol from synthesis gas (CO and $H_2$) is an exothermic reaction that is equilibrium limited and may be conducted in accordance with the inventive process. Higher temperatures favor methanol synthesis kinetics but disfavor higher equilibrium conversions. For example, for the synthesis of methanol from synthesis gas at a temperature of about 300° C. and a pressure of about 735 psig the maximum attainable conversion is about 15%. At a temperature of about 200° C. and a pressure of about 735 psig the maximum attainable equilibrium conversion increases to about 65%. On the other hand, the inventive process channel operating at a relatively high temperature of about 200 to about 300° C. at its entrance may approach equilibrium conversion, or in one embodiment obtain a conversion of about 50% to about 99% of the thermodynamic limit of conversion, and at a lower temperature of about 100 to about 200° C. near its exit achieves a higher overall conversion as allowed by a higher equilibrium potential near the reactor exit.

Ammonia synthesis is another exothermic reaction that is equilibrium limited and may be conducted in accordance with the inventive process. At higher temperatures, faster kinetics favor conversion of nitrogen and hydrogen to ammonia. However, the attainable equilibrium conversion is lower. As the temperature decreases, the corresponding reaction kinetics also decrease while the equilibrium potential favors higher conversions. For example, at a temperature of about 300° C. and a pressure of about 735 psig the maximum attainable conversion is about 15% per single pass through a reactor. At a temperature of about 200° C. and a pressure of about 735 psig the maximum attainable conversion increases to about 75%. With the inventive process the process channel may be operated at a relatively high temperature of about 300 to about 500° C. at or near its entrance. This provides faster kinetics for converting nitrogen and hydrogen to approach the available thermodynamic conversion limit. At or near the exit to the process channel, a lower temperature of about 100 to about 300° C. may be used to provide an additional amount of synthesis to approach a higher available thermodynamic conversion limit.

The inventive process is suitable for conducting one or more of the following chemical reactions: acetylation addition reactions, alkylation, dealkylation, hydrodealkylation, reductive alkylation, amination, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, Fischer-Tropsch reaction, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, isomerization, methylation, demethylation, metathesis, methanol synthesis, nitration, oxidation, partial oxidation, polymerization, reduction, reformation, reverse water gas shift, sulfonation, telomerization, transesterification, trimerization, Sabatier reaction, carbon dioxide reforming, preferential oxidation, or preferential methanation.

The inventive process is particularly suitable for conducting a water gas shift reaction and will now be described with respect to conducting such a reaction. Referring to FIG. 1, reactants 10 flow through single stage process channel 20 where the reactants contact catalyst 30 contained within the single stage process channel and are converted to product 40. The reactants 10 are comprised of CO and $H_2O$. The catalyst 30 is a water-gas shift reaction catalyst. The product 40 is comprised of $H_2$ and $CO_2$. The reactants 10 and product 40 flowing through the single stage process channel 20 are cooled by coolant fluid 50 which is in thermal contact with single stage process channel 20. The coolant fluid 50 flows through coolant channels in a cross current direction relative to the direction of the flow of the reactants 10 and product 40. Alternatively, the coolant fluid may flow concurrently or counter currently relative to the flow of the reactants 10 and product 40. The product 40 may be advanced to a storage tank, a fueling station, a hydrocracker, a fuel cell system, a hydrotreater or to a hydrogen purifier. The product 40 may be used in oil refining chemical processing, and the like.

The $H_2$ in the product 40 may be purified. This may be done in a clean up process to remove part or all of the carbon monoxide from the product 40. The clean up process may be conducted within the single stage process channel 20 or outside the single stage process channel 20. The clean up process may be conducted using a preferential oxidation reactor, membrane separation of either hydrogen or carbon monoxide, sorption based separation system for either hydrogen or carbon monoxide, a methanation reactor, and the like.

Figure 2:
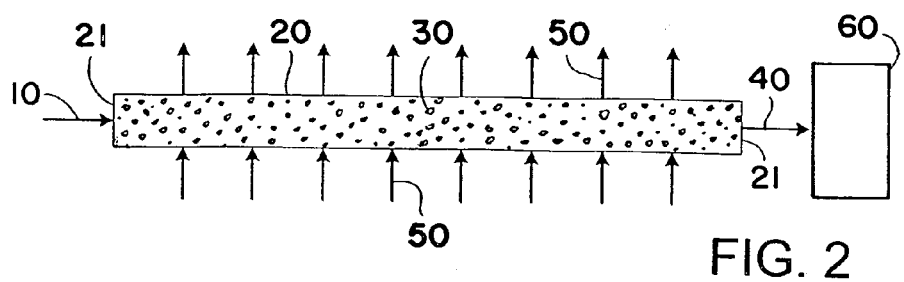
FIG. 2 is a schematic flow sheet illustrating an alternate embodiment of the inventive process.

The $H_2$ in the product 40 may be used to operate a fuel cell. In the fuel cell the $H_2$ is combined with $O_2$ to make electricity. Referring to FIG. 2, the reactants 10 are converted to product 40 in single stage process channel 20 in the same manner as discussed above. The $H_2$ in the product 40 is advanced to fuel cell 60 where it is combined with $O_2$ to make electricity. Fuel cells that may be used are commercially available and need not be described herein.

The $H_2$ from the product 40 may be used to hydrogenate, hydrotreat, hydroalkylate, hydrocrack or hydrodesulfurize a feedstock. The $H_2$ from the product may be reacted to form hydrogen chloride, hydrogen bromide, ethanol, methanol, ammonia, and the like.

The $H_2$ from the product 40 may be used to make a metal hydride such as $MgH_2$, $Mg_2NiH_4$, $TiFeH_2$, $LaNi_5H_6$, $PdH_2$, and the like. The $H_2$ from the product may be used to hydrogenate a fat or an oil. The $H_2$ from the product may be used to reduce a metal ore or a catalyst.

The water-gas shift reaction that occurs within the single stage process channel 20 is an exothermic reaction. The combination of heat generated in the exothermic reaction and cooling that is employed with the inventive process has the effect of forming a high temperature reaction zone near the entrance 21 of the single stage process channel 20 and a lower temperature reaction zone near the exit 22 of the single stage process channel 20. The rate of reaction is higher in the high temperature reaction zone where the bulk of the conversion of CO takes place. The rate of reaction is lower in the lower temperature reaction zone but the allowable equilibrium conversion increases in the lower temperature reaction zone.

The single stage process channel 20 may have a cross section having any shape, for example, a square, rectangle or circle. The cross section of the channel may vary in shape or size at different points along the length of the channel. For example, the cross section of the process channel may taper from a relatively large dimension to a relatively small dimension (or vice versa) over the length of the process channel. The single stage process channel 20 may be a microchannel. The length of the single stage process channel 20 may be from about 0.05 inch (1.27 mm) to about 20 feet (6.1 meters), and in one embodiment about 1 inch (2.54 cm) to about 4 feet (1.22 meters). Although the above discussion refers to the use of a single stage process channel 20, it is to be understood that with the inventive process a plurality of process channels may be operated in parallel. For example, tens, hundreds, thousands, tens of thousands, hundreds of thousands or millions of single stage process channels 20 operating at the same time in parallel may be employed with the inventive process.

The reactants 10 may comprise any fluid mixture containing CO and $H_2O$. The fluid mixture may be gaseous, liquid or a mixture thereof. The reactants 10 may comprise an exhaust gas from a primary conversion reactor where a process such as steam reforming, partial oxidation or autothermal reforming is conducted. The reactants 10 may comprise up to about 50 mol % CO and up to about 99.9 mol % $H_2O$. In one embodiment, the reactants 10 comprise from about 1 to about 40 mol % CO, and in one embodiment about 2 to about 30 mol % CO; and from about 1 to about 90 mol % $H_2O$, and in one embodiment about 1 to about 80 mol % $H_2O$. The reactants 10 may also comprise other materials such as $CO_2$, $H_2$ and/or inert gases such as $N_2$. In one embodiment the reactants 10 comprise: from about 1 to about 20 mol % CO, and in one embodiment about 3 to about 15 mol % CO; about 1 to about 70 mol % $H_2O$, and in one embodiment about 3 to about 60 mol % $H_2O$; about 1 to about 20 mol % $CO_2$, and in one embodiment about 3 to about 15 mol % $CO_2$; and about 1 to about 75 mol % $H_2$, and in one embodiment about 10 to about 60 mol % $H_2$. In one embodiment, the mole ratio of $H_2O$ to CO is at least about 1:1, and in one embodiment from about 1:1 to about 10:1, and in one embodiment about 1:1 to about 5:1, and in one embodiment about 1:1 to about 2:1.

The catalyst 30 may be any water-gas shift reaction catalyst known in the art. The catalyst may be comprised of one or more: catalyst metals, including noble metals, transition metals and combinations thereof; metal oxides, including oxides of alkali metals, alkaline earth metals, boron, gallium, germanium, arsenic, selenium, tellurium, thallium, lead, bismuth, polonium, magnesium, titanium, vanadium, chromium, manganese, iron, nickel, cobalt, copper, zinc, zirconium, molybdenum, tin, calcium, aluminum, silicon, lanthanum series element (s), and combinations thereof; composites; zeolite (s); nitrides; carbides; sulfides; halides; phosphates; and combinations of any of the above.

In one embodiment, the catalyst is a zirconia supported, alkali metal modified, ruthenium catalyst.

In one embodiment, the catalyst comprises cupric oxide, zinc oxide and aluminum oxide. This catalyst may be reduced.

In one embodiment, the catalyst comprises Pt, Pd, Cu, Fe, Rh, Au, Re, or an oxide of any of the foregoing.

In one embodiment, the catalyst comprises a transition metal carbide, nitride or boride, or an oxygen containing analog of any of the foregoing.

In one embodiment, the catalyst comprises a support that is impregnated with a reducible metal oxide. The reducible metal oxide may comprise an oxide of Cr, V, Mo, Nd, Pr, Ti, Fe, Ni, Mn, Co, Ce, or a mixture of two or more thereof.

In one embodiment, the catalyst comprises a support selected from aluminum, silica, titania or zirconia.

The catalyst 30 may have any size and geometric configuration that fits within the single stage process channel 20. The catalyst may be in the form of particulate solids (e.g., pellets, powder, and the like) having a median particle diameter of about 60 to about 1000 $\mu$m, and in one embodiment about 300 to about 600 $\mu$m. The catalyst 30 may be comprised of a porous structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a structure of tangled strands, like steel wool. The catalyst 30 may have a honeycomb structure, or the structure of an insertable fin. The fin may have straight channels or may take the form of an offset strip fin. The number of fins per inch may range from about 4 to about 90. The fins may have a thickness of about 0.001 to about 0.1 inch. The catalyst may be in the form of a flow through structure such as a foam, wad, pellet or powder, or gauze. The catalyst may be in the form of a flow-by structure such as a felt with an adjacent gap, a foam with an adjacent gap, a fin structure with gaps, a washcoat on any inserted substrate, or a gauze that is parallel to the flow direction with a corresponding gap for flow. The catalyst may be directly washcoated on the interior walls of the process channel. The catalyst may be in the form of a single piece of porous contiguous material, or many pieces in physical contact. In one embodiment, the catalyst is comprised of a contiguous material and has a contiguous porosity such that molecules can diffuse through the catalyst. In this embodiment, the gaseous reactant 10 and gaseous product 40 flow substantially through the catalyst (single or multiple pieces) rather than around it, and the gaseous reactant 10 may react anywhere along its passage through the catalyst 30. In one embodiment, the cross-sectional area of the catalyst occupies at least about 80%, and in one embodiment at least about 95% of the cross-sectional area of the process microchannel 20. The catalyst may have a surface area, as measured by BET, of greater than about 0.5 $m^2/g$, and in one embodiment greater than about 2.0 $m^2/g$.

The catalyst 30 may be comprised of a porous support, a solution deposited interfacial layer on the porous support, and a catalyst material on the interfacial layer. In one embodiment the catalyst 30 has a porous support, a buffer layer, an interfacial layer, and a catalyst material. Any of the foregoing layers may be continuous or discontinuous as in the form of spots or dots, or in the form of a layer with gaps or holes.

The catalyst 30 may be supported on a porous substrate having a porosity of at least about 5% as measured by mercury porosimetry and an average pore size (sum of pore diameters divided by number of pores) of about 1 to about 1000 $\mu$m. The porous support may be a porous ceramic or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, has a different composition and/or density than both the support and the interfacial layers, and in one embodiment has a coefficient of thermal expansion that is intermediate the thermal expansion coefficients of the porous support and the interfacial layer. The buffer layer may be a metal oxide or metal carbide. The buffer layer may be comprised of $Al_2O_3$, $TiO_2$, $SiO_2$, $ZrO_2$, or combination thereof. The $Al_2O_3$ may be $\alpha$-$Al_2O_3$, $\gamma$-$Al_2O_3$ or a combination thereof. $\alpha$-$Al_2O_3$ provides the advantage of excellent resistance to oxygen diffusion. The buffer layer may be formed of two or more compositionally different sublayers. For example, when the porous support is metal, for example a stainless steel foam, a buffer layer formed of two compositionally different sub-layers may be used. The first sublayer (in contact with the porous support) may be $TiO_2$. The second sublayer may be $\alpha$-$Al_2O_3$ which is placed upon the $TiO_2$. In one embodiment, the $\alpha$-$Al_2O_3$ sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 $\mu$m, and in one embodiment about 0.05 to about 5 $\mu$m.

In one embodiment of the invention, adequate adhesion and chemical stability may be obtained without a buffer layer. In this embodiment the buffer layer may be omitted.

The interfacial layer may be comprised of nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may be comprised of a metal oxide. Examples of metal oxides that may be used include $\gamma$-$Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. Usually, however, the interfacial layer is used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 $\mu$m, and in one embodiment from about 1 to about 50 $\mu$m. The interfacial layer may be either crystalline or amorphous. The interfacial layer may have a BET surface area of at least about 1 $m^2$/g.

The catalytically active material may be any of the catalyst materials (i.e., metals, oxides, composites, etc.) discussed above. The catalytically active material may be deposited on the interfacial layer. Alternatively, the catalytically active material may be simultaneously deposited with the interfacial layer. The catalytically active layer may be intimately dispersed on the interfacial layer. That the catalytically active layer is "disposed on" or "deposited on" the interfacial layer includes the conventional understanding that microscopic catalytically active particles are dispersed: on the support layer (i.e., interfacial layer) surface, in crevices in the support layer, and in open pores in the support layer.

The contact time within the single stage process channel 20 of the reactants and/or product 40 with the catalyst 30 may range from about 10 to about 1000 milliseconds, and in one embodiment from about 15 to about 500 milliseconds, and in one embodiment about 50 to about 250 ms, and in one embodiment about 50 to about 150 milliseconds.

The temperature of the reactants 10 entering the single stage process channel 20 may range from about 200° C. to about 500° C., and in one embodiment about 200° C. to about 300° C.

The reactants 10 entering the single stage process channel 20 may be at a pressure of up to about 500 psig, and in one embodiment about 20 inches of water to about 400 psig.

The temperature in the high temperature reaction zone within the single stage process channel 20 may range from about 200° C. to about 500° C., and in one embodiment about 250° C. to about 350° C. The temperature in the lower temperature reaction zone within the single stage process channel 20 may range from about 150° C. to about 300° C., and in one embodiment about 200° C. to about 250° C. The temperature within the high temperature reaction zone may be at least about 20° C. higher than the temperature in the lower temperature reaction zone. The length of the high temperature reaction zone within the single stage process channel 20 may comprise about 5 to about 50%, and in one embodiment about 10 to about 20% of the overall length of the single stage process channel 20. The length of the lower temperature reaction zone within the single stage process channel 20 may comprise from about 50 to about 95%, and in one embodiment about 80 to about 90% of the overall length of the process channel. The change from reaction conditions in the high temperature reaction zone to reaction conditions in the lower temperature reaction zone may be gradual.

The pressure drop of the reactants 10 and/or product 40 as they flow through the single stage process channel 20 may range up to about 60 pounds per square inch per foot of length of the process channel (psi/ft), and in one embodiment from about 2 inches of water per foot of length of process channel (in water/ft) to about 40 psi/ft, and in one embodiment from about 2 in water/ft to about 20 psi/ft, and in one embodiment from about 2 in water/ft to about 10 psi/ft, and in one embodiment about 2 in water/ft to about 5 psi/ft, and in one embodiment about 2 in water/ft to about 2 psi/ft, and in one embodiment about 2 in water/ft to about 1 psi/ft, and in one embodiment about 2 in water/ft to about 10 in water/foot.

The product 40 may comprise up to about 50 mol % $CO_2$ and up to about 99.9 mol % $H_2$. The product 40 may comprise from about 0.1 to about 50 mol % $CO_2$, and in one embodiment about 5 to about 30 mol % $CO_2$ on a dry gas bases. The product 40 may comprise from about 0.1 to about 90 mol % $H_2$, and in one embodiment about 50 to about 75 mol % $H_2$ on a dry gas bases. The product 40 may also contain other materials such as CO, $H_2O$, $CH_4$ and/or inert gases such as $N_2$. In one embodiment the product 40 comprises from about 0.1 to about 30 mol % $CO_2$, and in one embodiment about 5 to about 15 mol % $CO_2$; about 0.1 to about 90 mol % $H_2$, and in one embodiment about 50 to about 75 mol % $H_2$; about 0.01 to about 5 mol % CO, and in one embodiment about 0.05 to about 1 mol % CO, and in one embodiment about 0.05 to about 0.2 mol % CO; about 40 to about 99 mol % $H_2O$, and in one embodiment about 50 to about 70 mol % $H_2O$; and up to about 10 mol % $CH_4$, and in one embodiment about 0.5 to about 2.5 mol % $CH_4$.

The coolant fluid 50 may be any fluid. These include air, steam, liquid water, gaseous nitrogen, liquid nitrogen, oils such as mineral oil, and heat exchange fluids such as Dowtherm A and Therminol which are available from Dow-Union Carbide.

The coolant fluid 50 entering the coolant channels may have a temperature of about −200° C. to about 400° C., and in one embodiment about −50° C. to about 300° C., and in one embodiment about 0° C. to about 200° C. The coolant fluid 50 exiting the coolant channels may have a temperature in the range of about 10° C. to about 300° C., and in one embodiment about 40° C. to about 230° C. The residence time of the coolant medium 50 in the coolant channels may range from about 1 to about 2000 milliseconds (ms), and in one embodiment about 2 to about 1000 ms, and in one embodiment from 2 to about 500 ms, and in one embodiment from about 2 to about 100 ms, and in one embodiment from about 2 to about 70 ms, and in one embodiment about 5 to abut 20 ms. The pressure drop for the coolant fluid 50 as it flows through the coolant channels may range from about 0.1 inch of water per foot of coolant channel (in water/ft) to about 60 pounds per square inch per foot of coolant channel (psi/ft), and in one embodiment from about 0.2 in water/ft to about 10 psi/ft, and in one embodiment about 0.3 in water/ft to about 1 psi/ft. The coolant channels may be microchannels.

In one embodiment, the process is conducted in a reactor containing a plurality of the single stage process channels 20 operating in parallel, the total internal volume of the single stage process channels 20 in the reactor being up to about 1 liter, and in one embodiment up to about 0.5 liter, and in one embodiment up to about 0.1 liter; and the process produces hydrogen at a rate of at least about 10 SLPM per liter of volume of the single stage process channels in the reactor, and in one embodiment at least about 50 SLPM per liter of volume of the single stage process channels in the reactor, and in one embodiment at least about 100 SLPM per liter of volume of the single stage process channels in the reactor.

In one embodiment, the process is conducted in a reactor containing a plurality of the single stage process channels 20 operating in parallel, the contact time of the reactants 10 and/or product 40 with the catalyst 30 is up to about 250 milliseconds (ms), and in one embodiment up to about 150 ms, and in one embodiment up to about 100 ms; and the process produces hydrogen at a rate of at least about 10 SLPM per liter of volume of the single stage process channels in the reactor, and in one embodiment at least about 50 SLPM per liter of volume of the single stage process channels in the reactor, and in one embodiment at least about 100 SLPM per liter of volume of the single stage process channels in the reactor.

In one embodiment, the process is conducted in a reactor containing a plurality of the coolant channels operating in parallel, the total pressure drop for the coolant flowing through the coolant channels being up to about 2 psi, and in one embodiment up to about 1 psi, and in one embodiment up to about 10 inches of water; and the process produces hydrogen at a rate of at least about 10 SLPM per liter of volume of the single stage process channels in the reactor, and in one embodiment at least about 50 SLPM per liter of volume of the single stage process channels in the reactor, and in one embodiment at least about 100 SLPM per liter of volume of the single stage process channels in the reactor.

Figure 3:
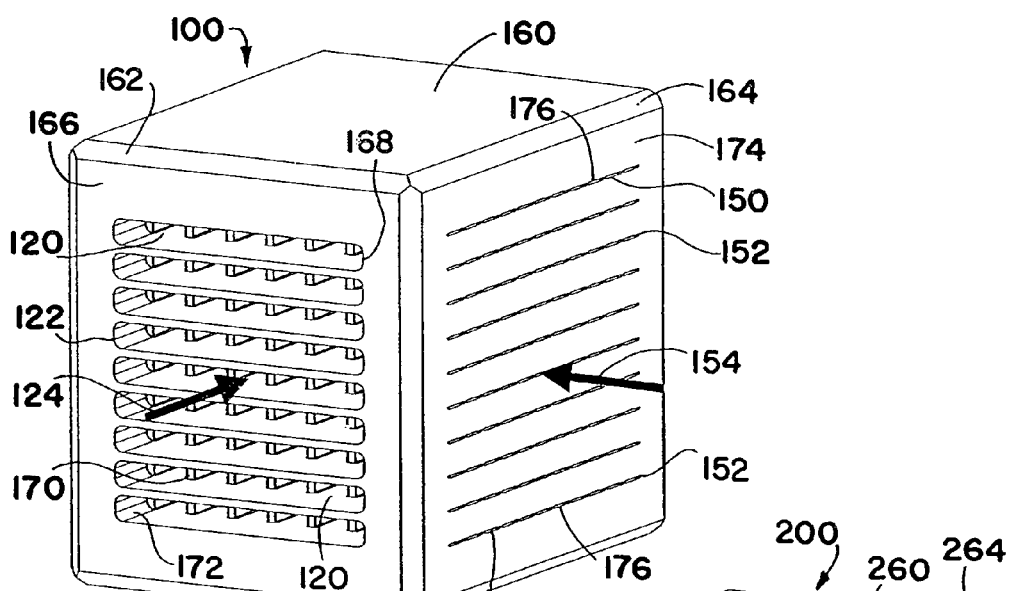
FIG. 3 is a schematic illustration of a cross flow reactor embodying the inventive apparatus in a particular form.

The inventive apparatus for conducting the inventive process is depicted, in one embodiment, in FIG. 3. Referring to FIG. 3, the inventive apparatus is comprised of reactor 100 which contains an array of single stage process microchannels 120 which extend parallel to each other and are arranged in rows 122. The rows 122 are positioned in separate planes one above another. The reactor 100 also contains an array of heat exchange channels 150 extending parallel to each other and arranged in rows 152. The rows 152 of heat exchange channels 150 are positioned in separate planes one above another. The heat exchange channels 150 extend transversely of and in thermal contact with the single stage process microchannels 120. The rows 152 of heat exchange channels 150, and the rows 122 of single stage process microchannels 120 are positioned in separate alternating planes one above another. The single stage process microchannels 120 and/or the heat exchange channels 150 may be microchannels.

The reactor 100 contains nine rows 122 of single stage process channels 120, with six single stage process microchannels 120 in each row 122 for a total of 54 single stage process channels. It is to be understood, however, that the reactor 100 may contain any number of single stage process microchannels 120, for example, hundreds, thousands or millions of process microchannels 120. Similarly, the reactor 100 contains 10 rows 152 of heat exchange channels 150. Each row 152 contains 11 heat exchange channels 150. It is to be understood, however, that although the illustrated reactor contains a total of 110 heat exchange channels, additional heat exchange channels 150, for example, thousands or millions of heat exchange channels 150 can be employed with the inventive reactor.

The single stage process microchannels 120 have cross sections in the form of squares or rectangles. The smallest internal dimension for each single stage process microchannel 120, whether it be height or width, may be up to about 10 mm, and in one embodiment from about 0.025 to about 10 mm, and in one embodiment from about 2 to about 8 mm. The length of each single stage process channel 120 may be from about 0.05 inch (1.27 mm) to about 20 feet (6.1 meters), and in one embodiment about 1 inch (2.54 cm) to about 4 feet (1.22 meters).

Each heat exchange channel 150 may have a cross section in the form of a square or rectangle and has a width or height of about 0.025 to about 10 millimeters, and in one embodiment about 1 to about 5 millimeters. The length of each heat exchange channel 150 may range from about 0.05 inch (1.27 mm) to about 20 feet (6.1 meters), and in one embodiment about 1 inch (2.54 cm) to about 4 feet (1.22 meters). The separation between each row 152 of heat exchange channels 150 and the next adjacent row 122 of single stage process microchannels 120 may range from about 0.1 to about 10 mm, and in one embodiment about 0.1 to about 5 mm, and in one embodiment about 0.1 to about 2 mm.

During the operation of the inventive process, the gaseous reactants 10 and gaseous product 40 flow through the single stage process channels 120 in the direction indicated by arrow 124. A catalyst is contained within the process microchannel. The heat exchange fluid 50 flows through the heat exchange channels 150 in the direction indicated by arrow 154.

The reactor 100 may be constructed of any material that provides sufficient strength and dimensional stability for carrying out the inventive process. Examples of suitable materials include steel (e.g., stainless steel, carbon steel, and the like), aluminum, titanium, nickel, and alloys of any of the foregoing metals, plastics (e.g., epoxy resins, UV cured resins, thermosetting resins, and the like), ceramics, glass, composites, quartz, silicon, or a combination of two or more thereof. The reactor 100 may be fabricated using known techniques including wire electrodischarge machining, conventional machining, laser cutting, photochemical machining, electrochemical machining, molding, water jet, stamping, etching (for example, chemical, photochemical or plasma etching) and combinations thereof. The reactor may be constructed by forming layers or sheets with features removed that allow flow passages. A stack of sheets may be assembled via diffusion bonding, laser welding, diffusion brazing, and similar methods to form an integrated device. The reactor 100 has appropriate openings, valves, etc. to control input of the reactants 110, output of the product 40, and flow of the heat exchange fluid 50. These are not shown in the drawings, but can be readily provided by those skilled in the art.

Figure 4:
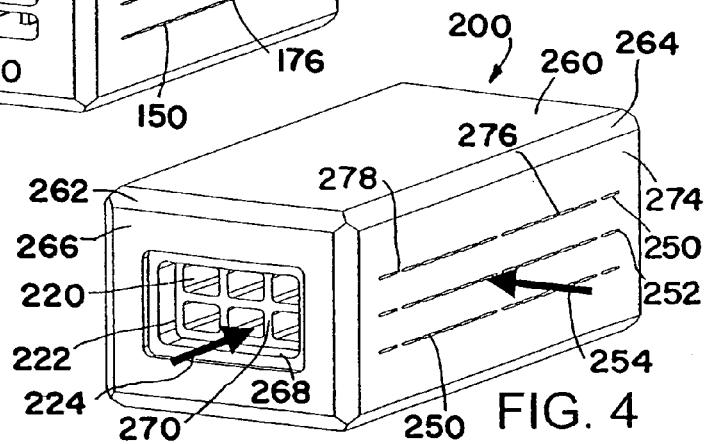
FIG. 4 is a schematic illustration of a cross flow reactor illustrating an alternate embodiment of the inventive apparatus.

The reactor 200 depicted in FIG. 4 is similar in design and construction to the reactor 100 depicted in FIG. 3 except that the reactor 200 has two rows 222 of single stage process channels 220 with three channels 220 in each row 222. Similarly, the reactor 200 has three rows 252 of heat exchange channels 250 with 12 heat exchange channels 250 in each row 252. During the operation of the inventive process, the reactants 10 and product 40 flow through the single stage process channels 220 in the direction indicated by arrow 224. The heat exchange fluid 50 flows through the heat exchange channels 250 in the direction indicated by arrow 254.

EXAMPLE 1

A reactor having the structure illustrated in FIG. 3 and a catalyst volume of 150 ml is fabricated from five distinct pieces: a reactor core 160, a process header 162, a process footer (not shown in the drawings), a coolant header 164 and a coolant footer (not shown in the drawings). Each piece is fabricated from SS316 stainless steel. Process header 162 and process footer have the same design and construction and coolant header 164 and coolant footer have the same design and construction. The process and coolant headers/footers differ in dimension. Each is formed by machining a pocket in a solid block using an end mill. For this reactor the heat exchange channels 150 are coolant channels, and the process channels 120 and coolant channels 150 are microchannels.

Reactor core 160 is fabricated by wire electrodischarge machining a solid block of SS316 stainless steel having the dimensions of 3.00×3.36×4.00 inches (7.62×8.53×10.16 cm). The reactor core 160 contains single stage process channels 120 and coolant channels 150 extending transversely of each other in alternating planes as illustrated in FIG. 3. Nine rows 122 of parallel single stage process channels 120 are located on the process face 166 which has the dimensions of 3.00×3.36 inches (7.62×8.53 cm). The opening 168 to each row 122 of process channels 120 is 2.626×0.200 inches (6.670×0.508 cm). Each row 122 of process channels 120 has 6 parallel process channels 120 each of which is 0.282 inch (0.716 cm) wide, 3.00 inches (7.62 cm) long, and a height or gap of 0.200 inch (0.508 cm). Each process channel 120 is separated from one another by a 0.060 inch (0.152 cm) wide rib 170. Each row 122 of process channels 120 has a slot 172 with a 0.200 inch (0.508 cm) gap that is 0.500 inch (1.27 cm) deep by 2.626 inches (6.670 cm) wide. The total active volume (volume containing catalyst) of the reactor 100 is 150 ml. Ten rows 152 of coolant channels 150 are located on the coolant face 174 of the reactor 100. Each row 152 of coolant channels 150 has 11 coolant channels 150. Each coolant channel 150 is 0.252 inch (0.640 cm) wide, 3.00 inches (7.62 cm) long and has a gap or height of 0.020 inch (0.051 cm). A 0.020 inch (0.051 cm) wide rib 176 separates each of the coolant channels 150 from one another.

The first step in assembling the reactor 100 is to weld the coolant header 164, coolant footer and associated tubing to the reactor core 160. After this quartz wool is inserted into the slots 172 in the rows 122 of process channels 120 on one of the process faces. The single stage process channels 120 are then filled with catalyst and quartz wool is inserted into the remaining slots 172. A metal cloth is then tack welded to each of the process faces 166 and over this a #6 mesh SS304 stainless steel screen is tack welded. The process header 162, process footer and associated tubing are then welded in place.

The process and coolant headers and footers are affixed to the reactor 100 to produce a U-type manifold and the piping is installed. The process channels 120 are vertically oriented and the coolant channels 150 are horizontally oriented. The gaseous reactant 10 flows upwardly against gravity through the process channels 120.

The catalyst is a commercially available low temperature shift (LTS) catalyst obtained from Süd-Chemie. This catalyst has the following composition: 40–55 wt. % ZnO, 35–50 wt. % CuO, 5–15 wt. % $Al_2O_3$ and <6 wt. % graphite. The catalyst, which is provided by the manufacturer in the form of large cylindrical pellets, is ground with a mechanical grinder and sieved prior to use. Particles passing through sieve No. 40 and retained on sieve No. 35 are selected. The ground catalyst has a median particle diameter (volume percent basis) of 511.4 $\mu$m. The size range of 200–660 $\mu$m contains 97% of the particles, the remaining 3% being in the range 10–30 $\mu$m.

Prior to being used the catalyst is reduced. Reduction is accomplished at atmospheric pressure by placing the catalyst in a reaction vessel and flowing 5 SLPM of nitrogen gas at 132° C. across the catalyst. When a steady state is reached the flow of nitrogen gas is reduced to 4.95 SLPM and 50 standard cubic centimeters at 0° C. and one atmosphere of pressure (SCCM) of hydrogen gas are introduced into the vessel in an inlet stream. The temperature of the inlet stream is then gradually raised (<0.2° C./min) to 165° C. At this temperature outlet gas samples are taken and analyzed until it is found that the effluent contains greater than 0.2 mol % hydrogen. The catalyst is maintained in the reaction vessel at 165° C. for one hour. The flow of nitrogen is then reduced to 4.90 SLPM and the hydrogen flow increased to 100 SCCM. After the change in flow, outlet gas samples are again taken until the effluent hydrogen concentration is in excess of 1.5 mol %. This occurs approximately 2.5 hours after the change in flows. The inlet gas temperature is then ramped to 215° C. at a rate of 0.25° C./min. Once at this temperature the effluent gas is sampled until the concentration of hydrogen is found to approach 2.0%. When the effluent hydrogen concentration reaches 1.9 mol % the flow of nitrogen is reduced to 4.75 SLPM and the flow of hydrogen is increased to 250 SCCM. The effluent gas is sampled periodically until the outlet concentration stabilizes at 4.3 mol %. At this point the flow of hydrogen is stopped and the reduction is complete.

The reactants 10 are a simulated reformer effluent stream containing 32.2 mol % $H_2O$, 51 mol % $H_2$, 10.8 mol % CO and 6 mol % $CO_2$. The reactor is operated over a range of contact times from 85 to 250 milliseconds (ms). The inlet pressure of the reactants 10 is 142 psig. The inlet temperature of the reactants 10 is varied between 215° C. and 250° C. and the inlet coolant temperature is varied between 195° C. and 250° C. The operation of the reactor 100 is started with an inlet reactant temperature of 215° C. and a contact time of 250 ms. The inlet temperature for the reactants 10 is increased to 250° C. in steps of 5° C. At each step the reactor 100 is allowed to come into steady state and the conversion of CO assessed prior to moving to the next temperature. When an inlet temperature of 250° C. is reached the contact time is moved to 100 ms in 50 ms increments. The coolant medium 50 is air. The flow rate of the coolant air is set at 150 SLPM and the inlet coolant temperature is adjusted at each process temperature to minimize the difference between the inlet temperature of the gaseous reactants 10 and the inlet temperature of the coolant medium 50. The reactor 100 is also operated based on an average or cross temperature that is calculated as the average value of six thermocouples measuring gas temperature, one in the top and one in the bottom of the coolant header 164 and footer (four thermocouples) and one in the process header 162 and footer.

The conversion of CO is controlled by adjusting the average or cross temperature of the gaseous reactants 10 and the gaseous product 40. The reactor is in continuous operation for 59 hours and 25 minutes. The operating target for the reactor is to obtain 95% of the equilibrium conversion of CO (90.6%) at an inlet temperature of 250° C. for a contact time of 100 ms. The reactor exceeds its operating target achieving a 97.5% conversion of CO at a contact time of 100 ms with inlet temperature of 230° C. The selectivity to $CO_2$ is 100% under all conditions.

The reactants 10 are introduced into the reactor 100 at a contact time of 250 ms and an inlet process gas temperature of 231° C. several samples are taken over a period of approximately two hours. The conversion of CO is 97.1%. The equilibrium conversion of CO for this gas at the inlet temperature that is used is 96.7%. Within experimental error the reactor achieves equilibrium conversion. At a contact time of 200 ms the conversion of CO is 96.6%, just less than the equilibrium value. The conversion of CO is 91.5% when the contact time is reduced to 100 ms. When the contact time is further reduced to 85 ms the conversion of CO is 90.4%.

Figure 5:
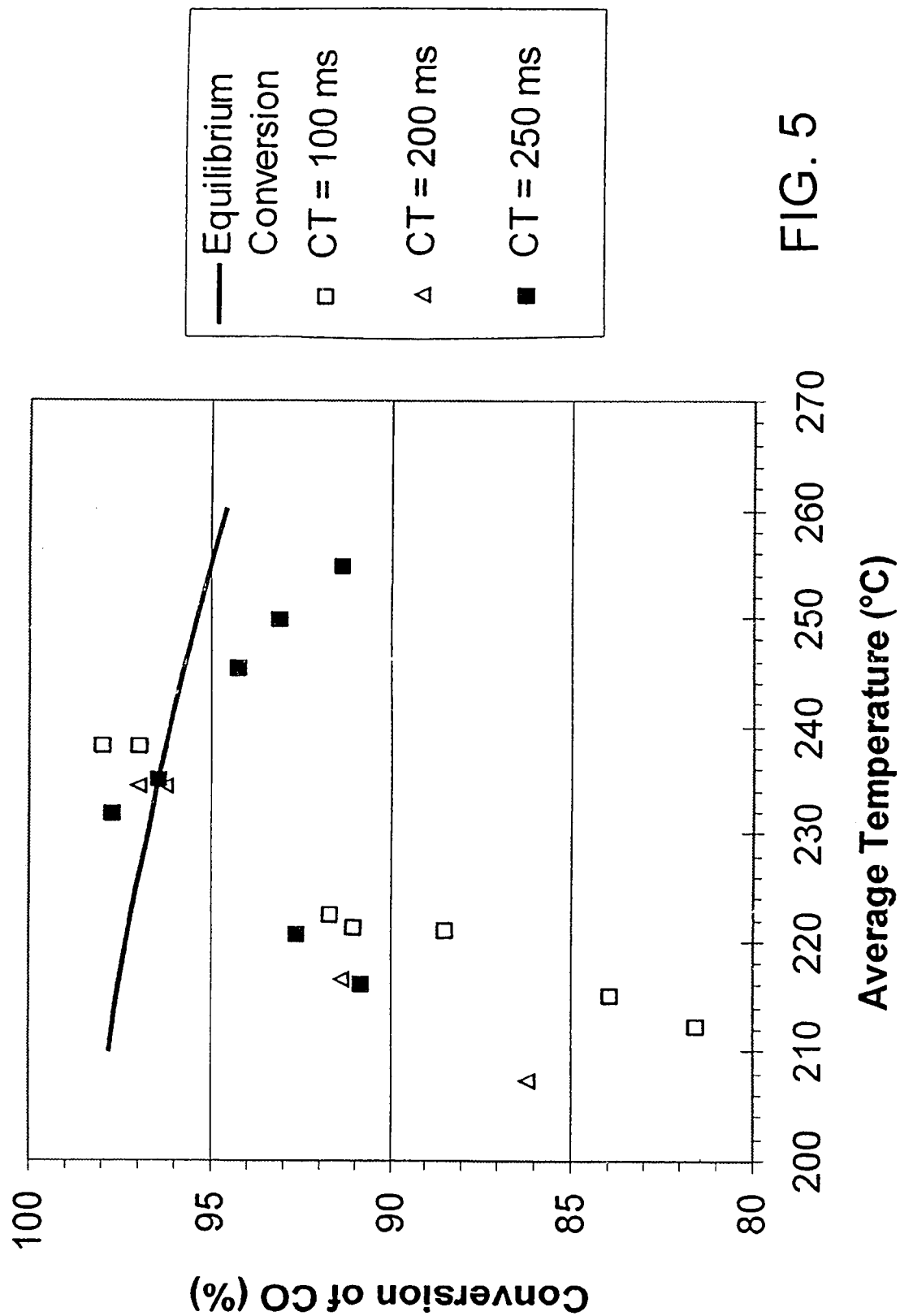
FIG. 5 is a plot of conversion of CO versus average temperature that is obtained in Example 1.

The conversion of CO versus temperature for the contact times of 100, 200 and 250 ms is plotted in FIG. 5. These plots show that the reactor 100 can be operated using two temperature zones depending on the cross temperature and demarcated by the point where the plot of CO conversion versus cross temperature meets the plot of the equilibrium conversion. In the first or high temperature reaction zone the reactor is in kinetic control, increasing the contact time increases the conversion of CO for a given temperature. In this reaction zone at a given contact time increasing the temperature will increase the rate and thereby the conversion of CO. In the second or lower temperature reaction zone the conversion of CO decreases with increasing temperature. In this reaction zone increases in conversion rate due to increased temperature are offset by a decrease in the equilibrium conversion.

The results indicate that the performance of a two-stage water-gas shift reactor system is achieved in a single stage channel device by operating in a non-isothermal manner with active cooling. This behavior arises out of the fact that when the exothermic water-gas shift reaction is conducted in the process channels 120 and coolant is allowed to flow in the coolant channels 150 the cross flow of the reactants 10/product 40 relative to the flow of the coolant fluid 50 develops a hot zone near the inlet of the process channels 120 where the rate of reaction is the greatest and the bulk of the conversion takes place and a cold zone near the exit of the process channels 120 where the rate of reaction is lower but the equilibrium conversion increases.

EXAMPLE 2

The process described in Example 1 is repeated except that the inlet pressure of the reactants 10 is 9.3–13.7 psig, and the reactants 10 contain 7.2 mol % CO, 34.7 mol % $H_2O$, 48.5 mol % $H_2$, 8.3 mol % $CO_2$ and 1.3 mol % $CH_4$. The inlet temperature of the reactants 10 is varied in the range 203–251° C. The contact time is varied in the range 200 to 250 ms. The maximum conversion of CO is 91.1% which is obtained at an inlet temperature of 251° C., an inlet pressure of 10.7 psig and a contact time of 239 ms.

EXAMPLE 3

The process described in Example 1 is repeated except that the process inlet temperature of the reactants 10 is 248° C., the inlet pressure of the reactants 10 is 13.3 psig and the contact time is 200 ms. The reactants 10 contain 7.1 mol % CO, 33.5% mol % $H_2O$, 50.3% $H_2$, 7.8 mol % $CO_2$ and 1.2 mol % $CH_4$. The conversion of CO is 87.8%.

EXAMPLE 4

A reactor 200 having the structure illustrated in FIG. 4 and a catalyst volume of 20.1 ml is fabricated as five distinct pieces: a reactor core 260, a process header 262, a process footer (not shown in the drawings), a coolant header 264 and a coolant footer (not shown in the drawings). Each piece is fabricated from SS316 stainless steel. The process header 262 and footer are alike in design and construction as are the coolant header 264 and footer. The process and coolant headers/footers differ in dimension. They are formed by machining a pocket in a solid block using an end mill. For this reactor the heat exchange channels 250 are coolant channels, and the single stage process channels 220 and coolant channels 250 are microchannels.

Reactor core 260 is fabricated by wire electrodischarge machining a solid block of SS316 stainless steel having the dimensions of 1.97×1.54×4.274 inches (5.00×3.91×10.856 cm). The reactor core 260 contains single stage process channels 220 and coolant channels 250 extending transversely of each other in alternating planes as illustrated in FIG. 4. Two rows 222 of parallel single stage process channels 220 are located on the process face 266 of the reactor 200. The process face 266 has the dimensions of 1.97×1.54 inches (5.00×3.91 cm). The single stage process channels 220 share a common opening 268 that is 1.032×0.585 inch (2.621×1.486 cm). Each row 222 of process channels 220 has three parallel process channels 220, each of which is 0.282 inch (0.716 cm) wide, 3.62 inches (9.19 cm) long and has a gap or height 0.200 inch (0.508 cm). Each process channel 220 is separated from the next by a 0.060 inch (0.152 cm) wide rib 270. The total active volume (volume containing catalyst) of the reactor 200 is 20.1 ml.

Reactor 200 has three rows 252 of coolant channels 250 located on the coolant face 274 of the reactor 200. Each row 252 of coolant channels 250 has 12 parallel coolant channels 250 that are 0.255 inch (0.648 cm) wide, 1.97 inch (5.00 cm) long and have a gap or height of 0.020 inch (0.051 cm). Each coolant channel 250 is separated from the next by a 0.020 inch (0.051 cm) wide rib 276 with the exception of the first and last coolant channel 250 in each row 252. These are separated from one another by 0.080 inch (0.203 cm) rib 278. The purpose of thickened rib 278 is to allow 0.033 inch (0.083 cm) thermocouple ports to be bored into the process microchannels 220.

The first step in assembling the reactor 200 device is to weld the coolant header 264, footer and associated tubing to the reactor core 260. A piece of SS316 stainless steel foam is inserted into the pocket at the outlet of the process channels 220. The foam is 0.25 inch (0.64 cm) thick, has 100 pores per inch (ppi) and has the dimensions of 1.065×0.555 inch (2.705×1.408 cm). A 1.227×0.717 inch (3.117×1.821 cm) piece of #6 mesh SS304 stainless steel grid is tack welded down to hold the stainless steel foam in place. The single stage process channels 220 are then filled with catalyst 30 and a second piece of stainless steel foam is inserted and a #6 mesh SS304 stainless steel screen is tack welded. The process header 262, footer and associated tubing are then welded in place. The process and coolant headers and footers are affixed to the device to produce a U-type manifold and the piping is installed such that the process channels 220 extend vertically and the coolant channels 250 extend horizontally. The gaseous reactant 10 flows downwardly through the single stage process channels 220 with gravity.

The catalyst used in reactor 200 is the same catalyst used in Example 1. Reactor 200 is operated at a contact time of 100 ms. The reactants 10 contain 9.6 mol % CO, 31.9% mol % $H_2O$, 51.0 mol % $H_2$, 5.5 mol % $CO_2$ and 1.9 mol % $CH_4$. The inlet pressure of the gaseous reactants 10 is 175 psig. The inlet temperature of the gaseous reactant 10 is varied in the range 227–269° C. The coolant medium is air. The coolant air inlet temperature (205–238° C.) and flow rate (20–50 SLPM) are used to control the output of the reactor 200. The pressure drop across the coolant side is 1 inch (2.54 cm) of water. The maximum conversion of CO is 93.7% which is obtained using a gaseous reactant inlet temperature of 242° C., coolant air inlet temperature of 208° C. and flow rate of coolant air of 20 SLPM.

While the invention has been explained in relation to various detailed embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for conducting an equilibrium limited chemical reaction in a single stage process channel to make a desired product, the single stage process channel comprising a microchannel, the process comprising:
   (A) flowing reactants through a first reaction zone in the single stage process channel under a first set of reaction conditions to produce an intermediate product, the first set of reaction conditions being suitable for producing a first theoretical equilibrium product, the intermediate product comprising the desired product; and
   (B) flowing reactants not reacted during step (A) and the intermediate product through a second reaction zone in the single stage process channel under a second set of reaction conditions to produce the final product, the second set reaction conditions being suitable for producing a second theoretical equilibrium product, the second theoretical equilibrium product having a higher concentration of the desired product than the first theoretical equilibrium product, the final product comprising the desired product;
   the chemical reaction being an exothermic reaction giving off heat or an endothermic reaction absorbing heat, the single stage process channel being cooled with added cooling when the chemical reaction is an exothermic reaction, the single stage process channel being heated with added heating when the chemical reaction is an endothermic reaction, the heat given off or absorbed as a result of the exothermic or endothermic chemical reaction in combination with the added cooling or added heating providing a first temperature in the first reaction zone and a second temperature in the second reaction zone, the first temperature and the second temperature differing by at least about 20° C.

2. The process of claim 1 wherein the concentration of the desired product in the final product is higher than in the intermediate product.

3. The process of claim 1 wherein subsequent to step (A) but prior to step (B) the reactants not reacted during step (A) and the intermediate product formed during step (A) flow through another reaction zone in the single stage process channel under another set of reaction conditions to produce another intermediate product, the another set of reaction conditions being suitable for producing another theoretical equilibrium product, the another theoretical equilibrium product having a higher concentration of the desired product than the first theoretical equilibrium product, the another intermediate product comprising the desired product.

4. The process of claim 1 wherein the chemical reaction is an exothermic reaction, and the process channel is cooled with added cooling.

5. The process of claim 4 wherein the process channel is cooled using a cooling fluid, the cooling fluid flowing through a cooling channel, the flow of cooling fluid through the cooling channel being cross current relative to the flow of the reactants through the process channel.

6. The process of claim 4 wherein the process channel is cooled using a cooling fluid, the cooling fluid flowing through a cooling channel, the flow of cooling fluid through the cooling channel being cocurrent relative to the flow of the reactants through the process channel.

7. The process of claim 4 wherein the process channel is cooled using a cooling fluid flowing through a microchannel.

8. The process of claim 4 wherein the process channel is cooled using a cooling fluid, the cooling fluid flowing through a cooling channel, the flow of cooling fluid through the cooling channel being counter current relative to the flow of the reactants through the process channel.

9. The process of claim 1 wherein the chemical reaction is an endothermic reaction, and the process channel is heated with added heating.

10. The process of claim 9 wherein the process channel is heated using a heating fluid, the heating fluid flowing through a heating channel, the flow of heating fluid through the heating channel being cross current relative to the flow of the reactants through the process channel.

11. The process of claim 9 wherein the process channel is heated using a heating channel, the heating fluid flowing through a heating channel, the flow of heating fluid through the heating channel being cocurrent relative to the flow of the reactants through the process channel.

12. The process of claim 9 wherein the process channel is heated using a heating channel, the heating fluid flowing through a heating channel, the flow of heating fluid through the heating channel belng counter current relative to the flow of the reactants through the process channel.

13. The process of claim 9 wherein the process channel is heated using heating fluid flowing through a microchannel.

14. The process of claim 1 wherein the reactants contact a catalyst during step (A) and/or step (B).

15. The process of claim 1 wherein the reactants contact a catalyst during steps (A) and (B), the catalyst in step (A) being the same as the catalyst in step (B).

16. The process of claim 1 wherein the reactants contact a catalyst during steps (A) and (B), the catalyst in step (A) being different than the catalyst in step (B).

17. The process of claim 1 wherein the process channel has an entrance, an exit and an elongated section extending between the entrance and the exit, the process channel further comprising at least one additional entrance in the elongated section, at least one additional reactant entering the process channel through the at least one additional entrance.

18. The process of claim 1 wherein the chemical reaction is a water gas shift reaction.

19. The process of claim 1 wherein the chemical reaction is an acetylation addition reaction, alkylation, dealkylation, hydrodealkylatlon, reductive alkylation, amination, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, Fischer-Tropsch reaction, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, isomerization, methylation, demethylation, metathesis, methanol synthesis, nitration, oxidation, partial oxidation, polymerization, reduction, reformation, reverse water gas shift, sulfonation, telomerization, transesterification, trimerization, Sabatier reaction, carbon dioxide reforming, preferential oxidation, or preferential methanation.

20. The process of claim 1 wherein a plurality of the process channels are operated in parallel.

21. The process of claim 1 wherein the process is conducted in an apparatus, the apparatus, comprising:
  an array of single stage process microchannels arranged in rows extending parallel to each other, a catalyst being contained within each single stage process microchannel; and
  an array of heat exchange channels arranged in rows extending parallel to each other, the heat exchange channels extending transversely of the single stage process microchannels, the rows of heat exchange channels and the rows of single stage process microchannels being positioned in separate alternating planes.

22. The process of claim 21 wherein the heat exchange channels are microchannels.

23. The process of claim 21 wherein the single stage process channels and the heat exchange channels are made of steel, aluminum, titanium, nickel, copper, brass, an alloy of any of the foregoing metals, a polymer, ceramics, glass, composites, quartz, silicon, or a combination of two or more thereof.

* * * * *